May 27, 1952     M. LEHMANN     2,598,566
INDUSTRIAL ELEVATING TRUCK Filed Sept. 8, 1949     6 Sheets-Sheet 1

INVENTOR.
BY MAX LEHMANN
Geo. B. Pitts
ATTORNEY

Fig.11a

May 27, 1952 M. LEHMANN 2,598,566
INDUSTRIAL ELEVATING TRUCK
Filed Sept. 8, 1949 6 Sheets-Sheet 6

INVENTOR.
MAX LEHMANN.
BY Geo. B. Pitts
ATTORNEY

UNITED STATES PATENT OFFICE 2,598,566

INDUSTRIAL ELEVATING TRUCK

Max Lehmann, East Cleveland, Ohio, assignor to The Baker-Raulang Company, Cleveland, Ohio, a corporation of Ohio Application September 8, 1949, Serial No. 114,560

8 Claims. (Cl. 187—9)

This invention relates to a truck of the elevating type for picking up loads at floor and elevated levels, transporting them from place to place and stacking loads in a ready manner.

The truck is provided with relatively stationary main guides and extensible guides mounted to slide endwise in the main guides. The extensible guides are preferably equal in length to the main guides and when in their lowest or normal position, both guides extend to a predetermined height or level. In this arrangement the mean height of the guides does not exceed the lowest overhead limit (for example, balconies, archways, openings, low ceilings, trailers, box cars) within the area where the truck is to be employed, and fluid pressure operated means are provided to (a) initially raise the elevating member to and from the predetermined height or level endwise of and relative to the main and extensible guides while the latter are in normal position and (b) simultaneously automatically move the extensible guides and elevating member upwardly when the latter is to be raised to various levels above the predetermined height or level. Accordingly, it will be seen that a wide range of load handling operations may be carried out in loading or unloading freight box cars and in areas having low ceilings, as well as where the handling operations require the operation of the elevating member to higher levels.

In trucks of this type, of which I have knowledge, it has been the general practice to provide elements on the elevating member which would engage devices on the extensible guides or other mechanism incorporated in and connected to both the extensible guides and elevating member, whereby raising of the latter would also simultaneously effect movement of the extensible guides upwardly beyond the main guides. Thus, such trucks have a limited range of utility as they could not be employed where low limit overhead conditions existed. As already set forth, the fluid pressure operated means herein disclosed not only raises the elevating member a predetermined distance independently of the guides (that is, without moving the extensible guides), but also serves to pick up and raise the extensible guides when the elevating member is raised to a higher level. The means for raising the elevating member consist of relatively movable members mounted between the base on which the main guides are supported and a cross member at the upper ends of the extensible guides, but are co-operatively related to move the latter guides only when the elevating member is to be raised beyond a predetermined level. Furthermore, as later set forth, the fluid operated means for raising and lowering the elevating member to and from the predetermined level or levels therebelow and/or thereabove require only one connection with the source of fluid supply under pressure.

It follows that the form of construction is greatly simplified and readily controlled to insure rapidity of operation.

One object of the invention is to provide in an industrial truck having main guide members and extensible guide members thereon and an elevating member movable endwise of the guide members, improved fluid pressure operated means associated with the guide members and operatively connected to the extensible guide members and elevating member to initially raise either the extensible guide members or the elevating member a predetermined distance and thereafter raise the other member or members to a higher level.

Another object of the invention is to provide in an industrial truck having fixed main guides and extensible guides and an elevating member movable endwise of the guides, improved fluid pressure operated means associated with the guides and operatively connected to the extensible guides and elevating member to raise and lower the latter independently of the guides or raise both the extensible guides and the elevating member dependent on the level to which the elevating member is to be raised.

Another object of the invention is to provide improved fluid pressure operated means for raising the elevating member on an industrial truck consisting of a plurality of concentrically related members movable upwardly and downwardly and respectively connected to the extensible guides and elevating member for co-ordinated relative movement to initially raise the elevating member relative to the extensible guides and thereafter raise the extensible guides, whereby the load carrier may be operated to meet various overhead conditions.

Another object of the invention is to provide improved fluid pressure operated means for operating the elevating member on an industrial truck, consisting of relatively movable, telescopically related elements, one of which is connected to the extensible guides, operable (a) to raise and lower the elevating member to various levels within a predetermined height while the extensible guides remain stationary in their lowest or normal position and (b) to raise both the extensible guides and elevating member to and from levels above the predetermined level, whereby a wide range of load handling operations may be efficiently and rapidly carried out.

Another object of the invention is to provide in an industrial truck having fixed main guides and extensible guides and an elevating member slidably mounted on and movable endwise of the extensible guides, improved fluid pressure operated means associated with the guides and operatively connected to the extensible guides and elevating member and arranged to initially raise the elevating member along and relative to the extensible guides to a predetermined height or level and thereafter raise the extensible guides relative to the main guides to position the elevating member at selected levels above the predetermined height or level.

A further object of the invention is to provide improved fluid pressure operated means for raising the elevating member of an industrial truck, of simplified and readily controlled construction.

Other objects of the invention will be apparent to those skilled in the art to which my invention relates from the following description taken in connection with the accompanying drawings, wherein.

Figures 6, 7, 8, 15:
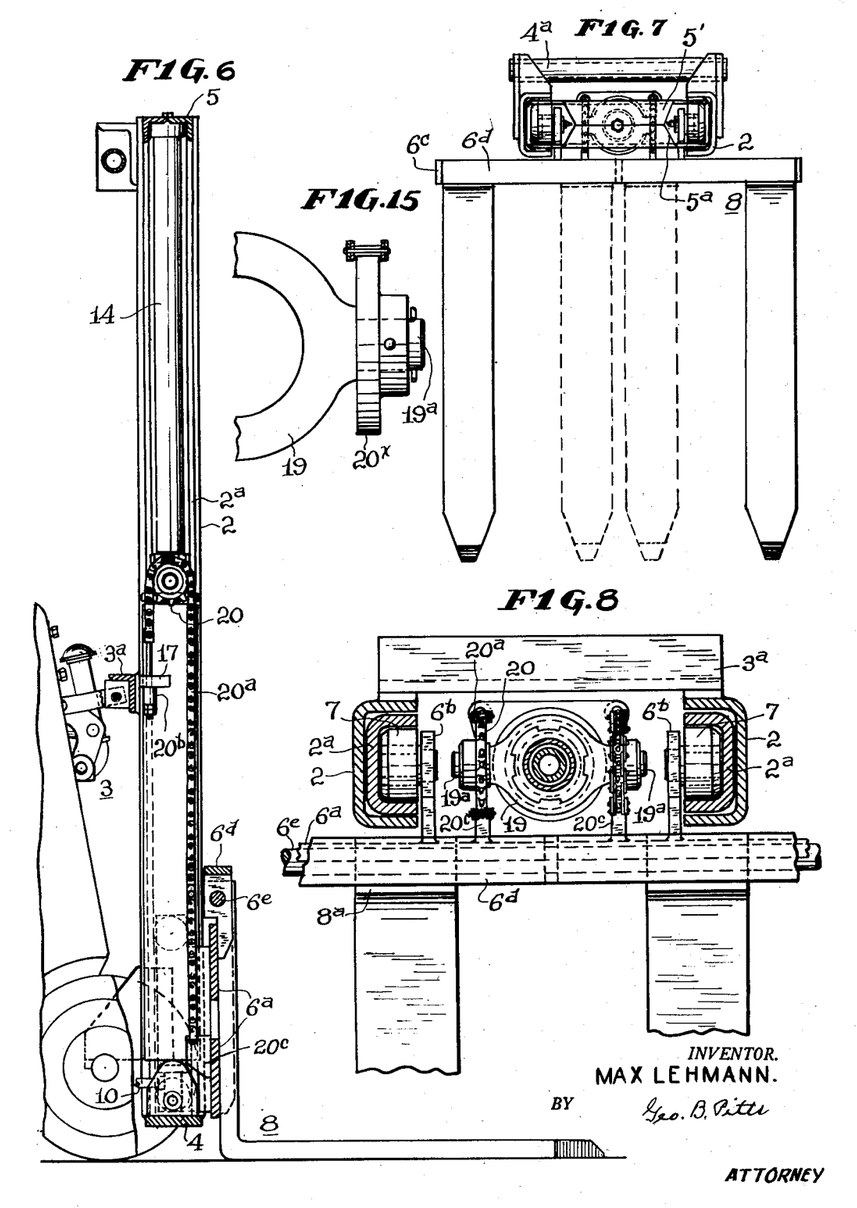
Fig. 6 is a section on the line 6—6 of Fig. 5.
Fig. 7 is a top plan view of Figs. 5 and 6; taken on the line 7—7 of Fig. 5.
Fig. 8 is a fragmentary view partly in plan and partly in section on the line 8—8 of Fig. 5.
Fig. 15 is a fragmentary plan view showing a modification.

In the drawings, 1 indicates as an entirety a truck mounted on power driven and steerable wheels 1a and provided with spaced main guides 2 and extensible guides 2a, telescopically related to the main guides 2. The guides 2, 2a, are adapted to be tilted inwardly (as shown in dotted lines in Fig. 2) by a suitable mechanism indicated as an entirety at 3 and connected to the guides 2 by an angle 3a. The tilting mechanism forms no part of the present invention, for which reason it is not illustrated in detail. The main guides 2 are provided on their outer sides with plates 2b, which extend inwardly and are pivotally supported on the truck frame in any desired manner. The lower ends of the guides 2 are fixed to a base 4 and connected together at their upper ends by a cross member 4a having support at its opposite ends in brackets 5 extending inwardly from the guides 2. The extensible guides 2a slidably engage the guides 2 (see Fig. 8) for movement endwise thereof and are connected together at their upper ends by a pair of related angles 5', which are cut away as shown at 5a (Fig. 7) to accommodate parts of the elevating member, indicated as an entirety at 6, when the latter is raised as later set forth.

The elevating member 6 consists of the following: 6a indicates a pair of upper and lower cross plates having rearwardly extending members 6b. Each member 6b supports upper and lower stud shafts on which are mounted rollers 7 having rolling engagement with inner sides of the extensible guides 2a, as later set forth. The cross plates 6a support a frame consisting of side plates 6c connected at their upper ends by a bar 6d and a rod 6e supported at its opposite ends by the side plates 6c. The elevating member 6 supports a load carrier 8, shown for illustrative purposes as consisting of a pair of forks the upright legs 8a of which are adjustably mounted on the rod 6e for movement toward or from each other.

Figures 1, 2, 2A, 3:
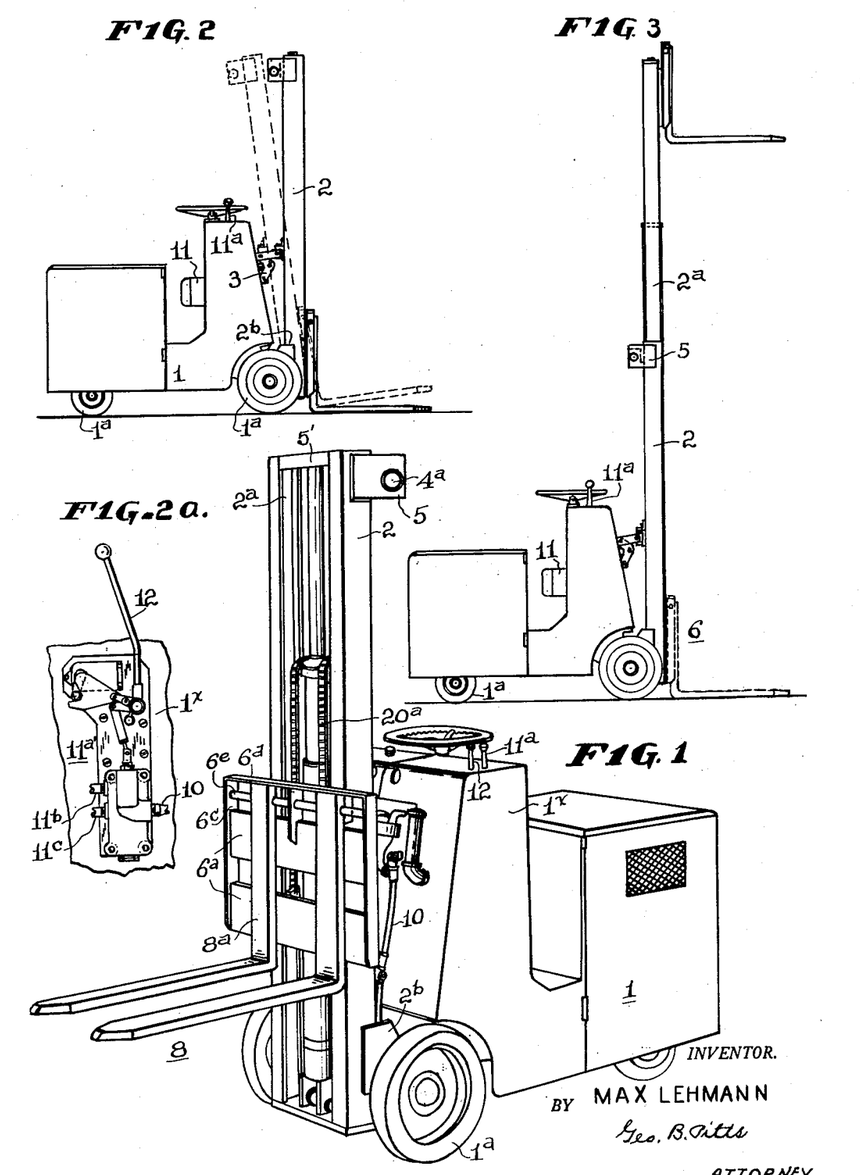
Fig. 1 is a perspective view of a truck, shown somewhat diagrammatically, embodying my invention, the elevating member being shown in an elevated position.
Fig. 2 is a side elevation, the elevating member being shown in its lowest position.
Fig. 2a is a fragmentary elevation.
Fig. 3 is a view similar to Fig. 2, but showing the extensible guides raised to the limit of their upward movement and the elevating member positioned at the upper end of the extensible guides.
Figures 4, 5:
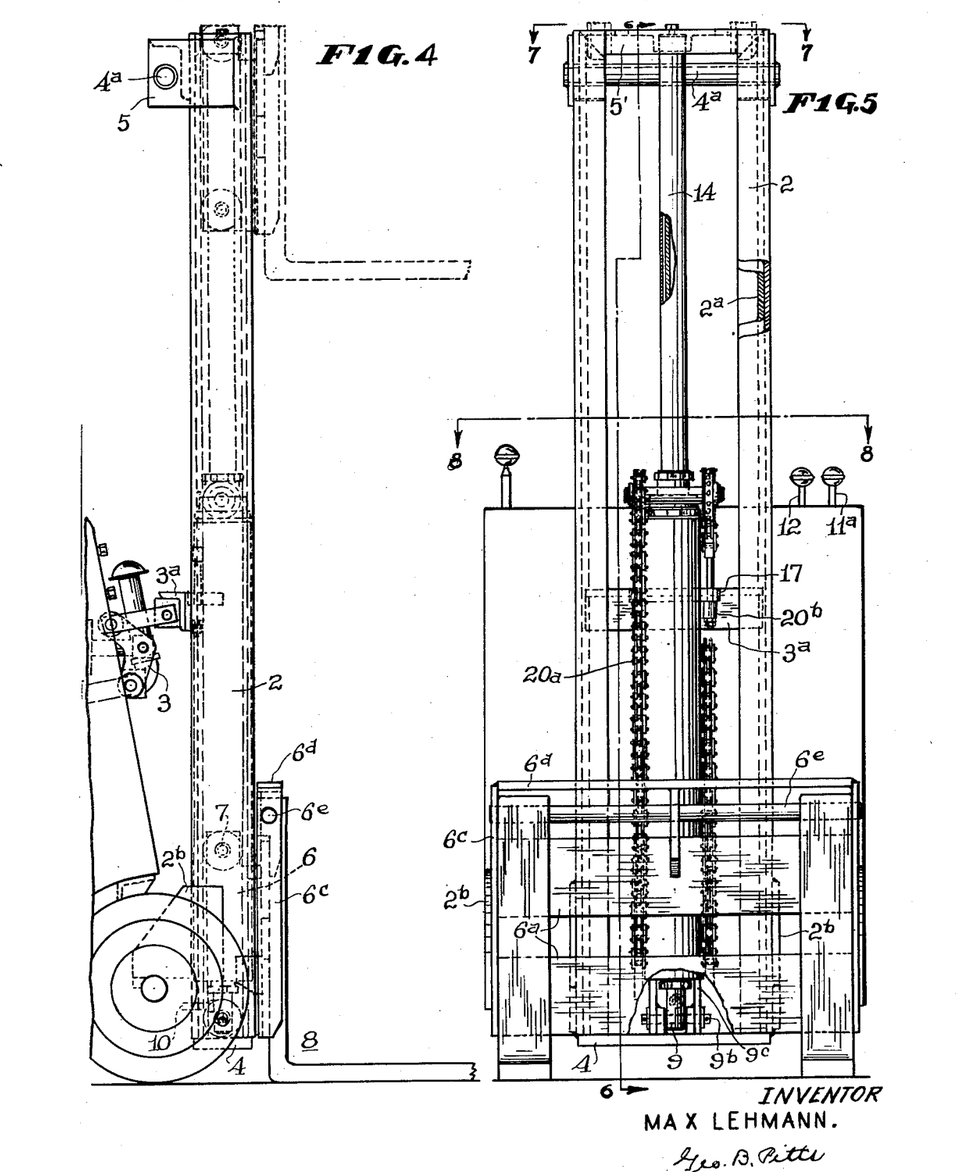
Fig. 4 is a fragmentary side elevation, enlarged; the elevating member being shown at its lowest position and parts being broken away.
Fig. 5 is a front elevation looking toward the left of Fig. 4, parts being broken away.
Figures 9, 10:
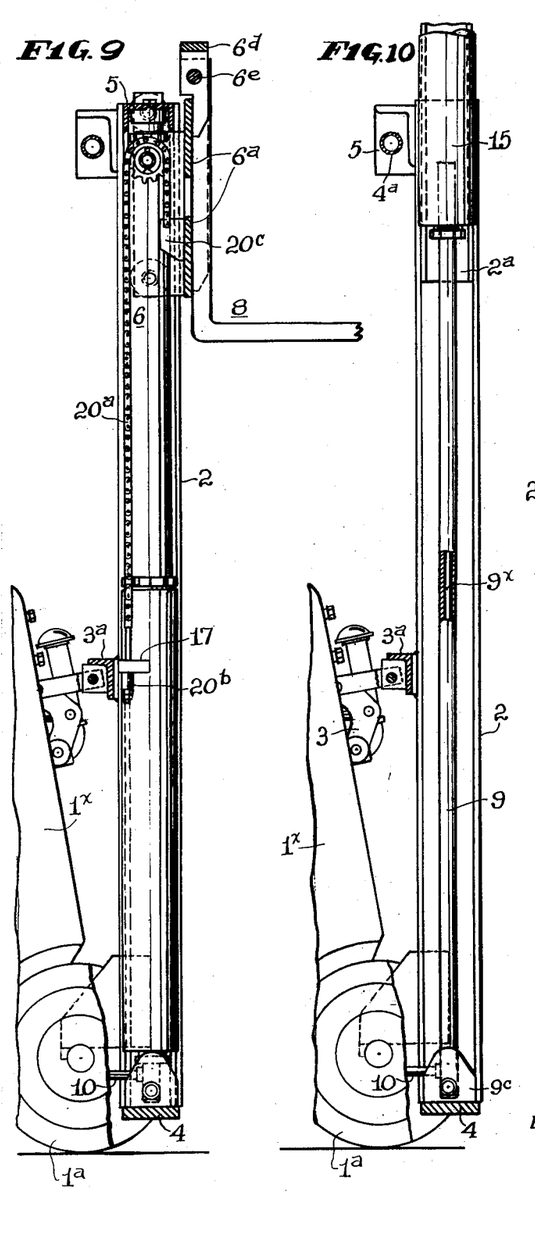
Fig. 9 is a sectional view similar to Fig. 6, but showing the elevating member raised to the predetermined height or level.
Figs. 10 and 10a together show the extensible guides raised to their uppermost position and the elevating member raised to the upper ends of the extensible guides.
Figure 10A:
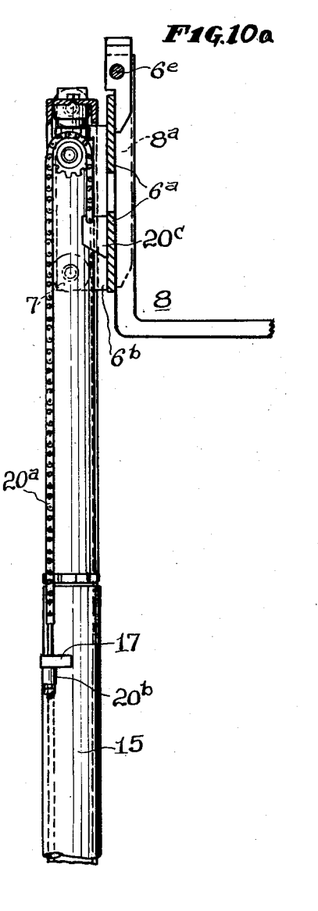
Figures 11, 11B, 12, 13, 14:
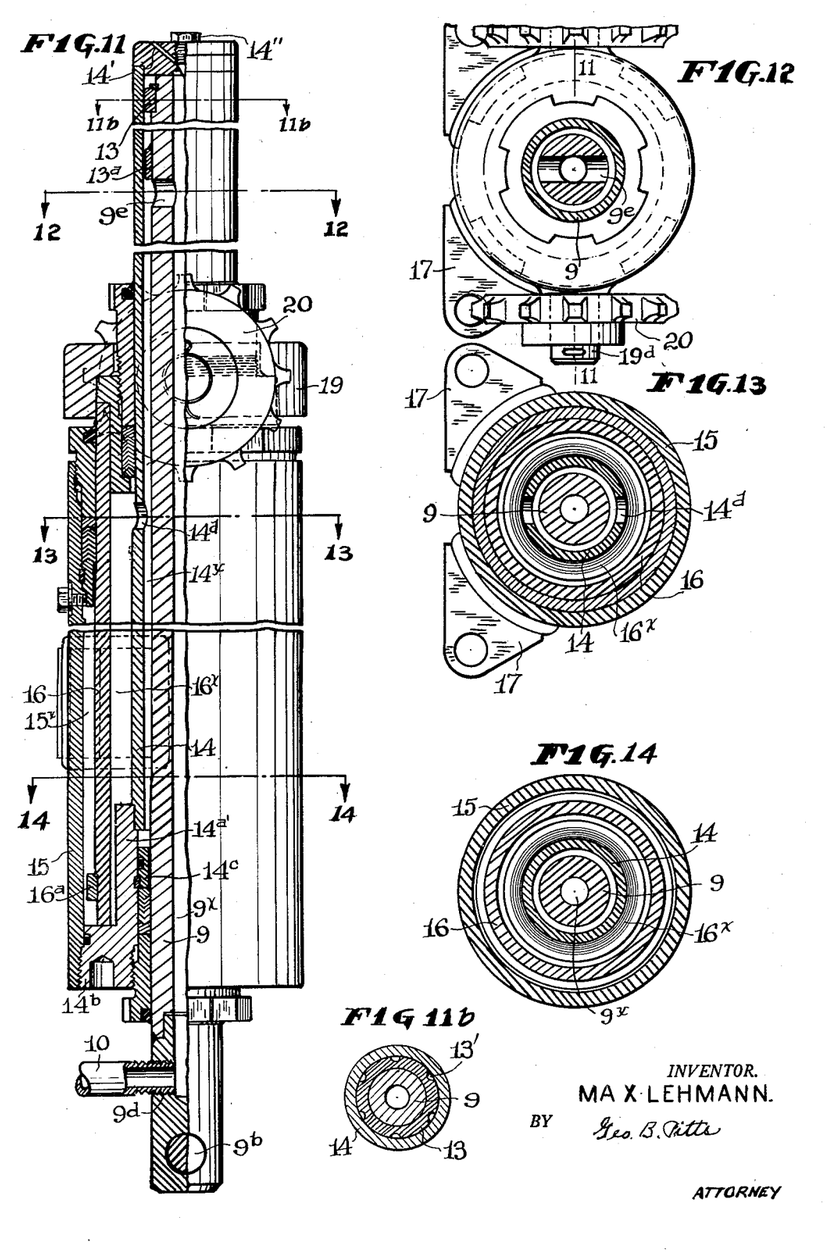
Fig. 11 is a fragmentary view of the fluid pressure operating mechanism, partly in section on the line 11—11 of Fig. 12.
Fig. 11b is a section on the line 11b—11b of Fig. 11.
Figs. 12, 13 and 14 are sections on the lines 12—12, 13—13 and 14—14, respectively, of Fig. 11.
Figure 11A:
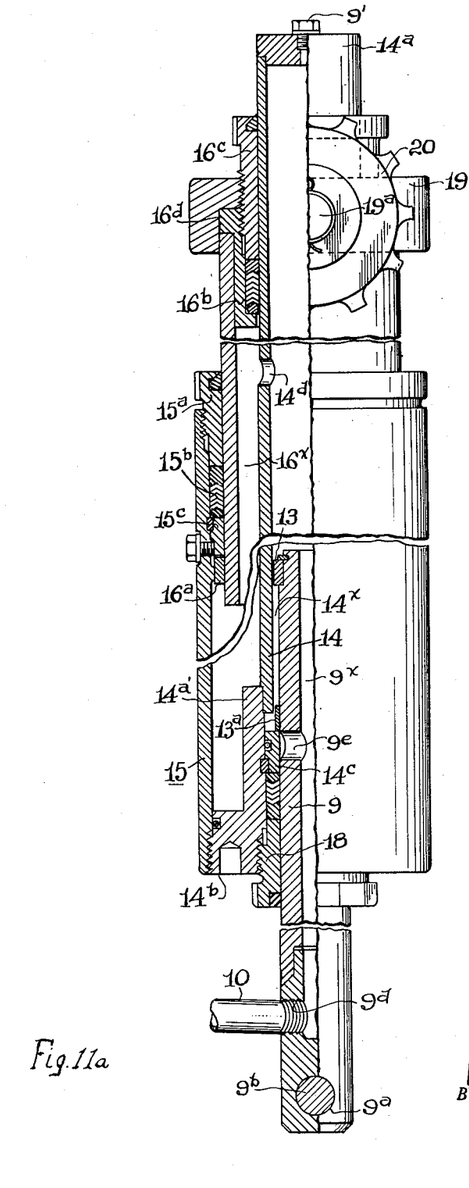
Fig. 11a is a view similar to Fig. 11, but showing the fluid operated members in their extended position.

The fluid pressure operated means consist of the following: 9 indicates a member mounted at its lower end on the base 4 and extends upwardly therefrom to approximately the height of the guides 2 (see Figs. 1, 5 and 10). The member 9 is axially related to and slidably supports a plurality of telescopically related, relatively movable piston-cylinder couples (later referred to). The member 9 is preferably hollow to form a passage for the fluid leading to one of the cylinders, as later set forth, to simplify the construction. The member 9 is formed adjacent its lower end with a diametrical through opening 9a to accommodate a pivot pin 9b, the opposite ends of which are supported in a pair of plates 9c suitably welded to the base 4. Above the opening 9a the member 9 is formed with a screw threaded inlet opening 9d in which the outer end of a supply pipe 10 is mounted. The supply pipe leads from a source of supply of fluid under pressure (such as oil) consisting of a pump operated by a suitable motor the intake of which is connected with a sump (not shown), the motor 11 being controlled by a lever mechanism 11a', having fluid connections 11b, 11c and a suitable valve 11a operated by a lever 12, controls the supply of fluid to and through the pipe 10. The pump, sump and valve 11a and the fluid connections therefor are mounted in a housing 1x. The pump and sump are of well known construction, for which reasons illustrations of these parts are omitted. The valve mechanism 11a' consists of a casing (see Fig. 2a) having an inlet 11c leading from the pump, an outlet 11b leading to the sump and a connection with the supply pipe 10. The upper end of the hollow member 9 is open and adjacent its upper end the member 9 is provided with upper and lower rings 13, 13a (see Fig. 11). The upper ring 13 forms a guide or spacer, as will later be apparent. The side wall of the ring 13 is provided with longitudinally extending grooves 13' (see Fig. 11b) to permit fluid flow past the ring for a purpose later set forth. The ring 13a serves as a stop as later set forth. Below and adjacent the ring 13a the member 9 is formed with a through opening 9e providing a fluid outlet from the flow conduit 9x which extends from the inlet 9d through the member 9. 14, 15 and 16 indicate, respectively, inner, outer and intermediate cylindrical members, the outer member 15 being provided exteriorly and intermediate its ends with anchors 17 (see Figs. 5, 6, 12 and 13) to which reference will later be made. The upper end of the inner member is closed by an end wall 14a, having a bleeder duct 14' closed by a plug 14''. The wall 14a is in engagement with the angles 5' and through the latter it operates to raise the extensible guides 2a when the inner member 14 is operated upwardly. The lower end of the inner member 14 is fixedly connected to an annulus 14a' which is integrally provided at its outer end with a ring 14b having screw threaded connection with the lower end of the outer member 15. The inner wall of the annulus 14a' is provided with a ring 14c which slidably engages the member 9 and co-operates with the ring 13 to provide an annular fluid space 14x between the member 9 and inner member 14. As will later appear, when the inner and outer members 14, 15, are operated, the ring 14c engages the ring 13a, whereby the latter limits the upward movement of the members 14, 15. The lower end of the annulus 14a' is provided with a suitable gland 18. Intermediate its ends, the wall of the inner member 14 is formed with ports 14d for a purpose later to be set forth. The upper end of the outer member 15 is provided with a suitable gland 15a and below the latter the inner wall of the member 15 is provided with a ring 15b which slidably engages the inner member 16 and co-operates with the ring 14b to provide an annular fluid space 15x between the members 15 and 16. Below the ring 15b, the outer member is provided with a separate ring 15c which serves as a stop, as later set forth. The intermediate member 16 is open at its lower end and engages the ring 14b when in its lowest or normal position (see Fig. 11). The outer wall of the intermediate member 16 adjacent its lower end is provided with a ring 16a, the side wall of which is provided with grooves extending longitudinally relative to the member 16 (similarly to ring 13) or relieved at spaced points circumferentially to permit fluid flow from the space 16x between the members 14 and 16 into the space 15x, or in the reverse direction. The upper end of the intermediate member 16 extends beyond the upper end of the outer member 15 and is provided interiorly with an annular member 16b in which a suitable gland 16c is positioned. The outer end of the annular member 16d is provided with an integral collar 16d on which is fixedly mounted a crosshead 19. The crosshead 19 is provided with diametrically related stud shafts 19d disposed on an axis parallel to and preferably in the plane of the axes of the rollers 7, the shafts 19d mounting freely rotatable reeving devices 20, which are engaged by a pair of flexible members 20a, preferably consisting of chains. As shown in Figs. 5, 6, 8, 11 and 12, the reeving devices 20 consist of sprockets, but, if desired, the devices 20 may have plain peripheral side walls as shown at 20x in Fig. 15, since the side bars of each of the chains 20a overlap the sides of the adjacent device 20x to prevent displacement of the chains. It is to be understood, however, that the invention is not to be limited to a chain as a wire cable and suitable reeving elements therefor, could be employed when found desirable. As shown in Figs. 5, 6, 7, 8, 9 and 10a, the chains 20a engage the reeving devices intermediate their ends, the inner runs of the chains being connected through adjustable elements 20b (Figs. 5, 6, 9 and 10a) to the anchors 17 and their outer runs being connected to brackets 20c extending rearwardly from the lower cross plate 6a of the elevating member 6.

From the foregoing description it will be observed that the inner and outer members 14, 15, are connected together and that the inner member 14 is in connected relation with the extensible guides 2a, whereas the intermediate member 16 is connected through the reeving devices 20 and flexible members 20a to the elevating member. In this arrangement, the cylindrical members may be of a size to provide piston areas, to which the pressure is applied, so related as to initially move the inner, outer and intermediate members 14, 15, 16, relative to the member 9; in this operation the guides 2a and elevating member 6 move with the members 14, 15 and 16. If this movement is continued until ring 14c engages the ring 13a, the supplied pressure will be effective to move the intermediate member 16 relative to the members 14, 15, which operation will in turn raise the elevating member 6 endwise of and to the upper ends of the extensible guides 2a, limited by the engagement of the ring 16a with the ring 15c. However, according to the construction herein disclosed and to provide for operation of the load carrier under low overhead conditions, as hereinbefore set forth, the effective area of the member 16b at the upper end of the intermediate member 16 is greater than that of the end wall 14a, so that upon the supply of the fluid pressure, the intermediate member is initially operated relative to the members 14, 15.

*Operation.*—Figs. 1, 4, 5, 6, and 11 show the cylindrical members 14, 15 and 16 in normal position, the member 14 being in engagement at its upper end with the angles 5' and the elevating member 6 being at its lower operating position; also, the system, including the flow or liquid spaces 9x, 14x, 15x and 16x, are filled with the liquid. If now the motor 11 is set in operation and the valve mechanism 11a' is operated by movement of the lever 12 in one direction from its mid-position to supply fluid to and through the pipe 10, fluid will flow through the space 9x, openings 9e, openings 14d and into space 16x. Due to the fact that the area of the wall 14a is less than the end area of the annular member 16b, the fluid pressure supplied through opening 9e will be effective to move the intermediate cylindrical member 16 upwardly relative to cylindrical members 14 and 15 and carry with it the reeving devices 20. As the chains are connected at their inner ends to the anchors 17 and at their outer ends to the elevating member 6, such upward movement of the reeving devices 20 will effect a raising of the elevating member 6 and carrier 8 relative to the extensible guides throughout the length thereof to the predetermined height or level, as shown in dotted lines in Fig. 4 and in full lines in Fig. 9; in raising the elevating member 6 to the predetermined height or level the ring 16a engages the stop ring 15c. If the valve mechanism is operated by the lever 12 to its other position, the elevating member 6 and carrier will gravitate and the liquid will flow from passage 16x in the reverse direction to the sump. By operating the valve mechanism in the manner just set forth, the elevating member may be operated to and from selected levels (one being shown in Fig. 1) below the predetermined height or level. In carrying out these operations, the pump 11 may be continuously driven since the valve mechanism is arranged to by-pass the liquid, except when the valve mechanism is in position to supply liquid to the system. In a full size truck built under my supervision and embodying the invention herein set forth, I provided a travel distance for the elevating member 6 to the predetermined height or level of 64 inches. To raise the elevating member 6 to levels above the predetermined height or level, the valve mechanism is maintained in its first mentioned position, so that following the raising of the elevating member 6 to the predetermined height or level, the pressure supplied through openings 9e and 14d is simultaneously applied to the wall 14a and annular member 16b. As the ring 16a' is in engagement with the ring 15c, the supplied pressure will be effective to move the cylindrical members 14, 15 and 16 upwardly as a unit on and relative to the fluid supply member 9; and (a) through the engagement of the inner member 14 with the angles 5' such movement of the member 14 will raise the extensible guides 2a endwise of the guides 2 to the limit of their movement (see Figs. 3, 10 and 10a) by engagement of the ring 14c with the ring 13a on the member 9 and (b) as the elevating member 6 was initially moved to the upper ends of the extensible guides prior to raising the latter, it will be observed that the carrier 8 is raised to the uppermost level as provided for by the length of the guides. If the valve mechanism 11a' is operated to its other position, the guides 2a, members 14, 15, 16, elevating member 6 and carrier 8 will gravitate as a unit to that position wherein the guides 2a are in normal position and the elevating member 6 is at the predetermined height or level and then the latter and cylinder 16 will gravitate to their normal position.

From the foregoing description it will be observed that the elevating member is movable on but relative to and independent of the extensible guides to the upper ends of the latter and to and from levels therebelow, whereby the load carrier may be operated where low overhead conditions, such as hereinbefore referred to, exist; in carrying out such operations the extensible guides remain stationary relative to the main guides.

Where the load carrier is to be operated at higher levels, the extensible guides are raised relative to the main guides and during such movement of the extensible guides the elevating member remains in fixed relation thereto. It will therefore be seen that the operating means are greatly simplified and through a single fluid pressure supply and co-ordinated connections between elements of the operating means and the elevating member and extensible guides, respectively, the load carrier is rapidly and readily controlled.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck, having in combination, a pair of main guides mounted on the truck frame, a pair of extensible guides telescopically mounted on said main guides for endwise movement thereof, an elevating member slidably mounted on said extensible guides for movement endwise thereof, and a fluid pressure system, including a plurality of concentrically related fluid pressure operated, relatively movable members, the inner one of which is mounted on the truck frame, another intermediate member being operatively connected to said elevating member, for initially raising said elevating member endwise of and relative to said extensible guides to a predetermined height or level and thereafter simultaneously raising said extensible guides and elevating member to position the latter at a level above the predetermined height or level.

2. In a truck, having in combination, a pair of main guides disposed substantially vertically and mounted on the truck frame, a pair of extensible guides extending upwardly to a predetermined height or level and telescopically mounted on said main guides, an elevating member slidably mounted on said extensible guides for movement endwise and from end to end thereof, and a fluid pressure system, including a fluid supply member mounted on the truck frame and inner, outer and intermediate cylindrical members disposed in concentric relation to each other and said supply member and fluid connections between them, the upper end of said intermediate member, outwardly of said outer cylindrical member, being operatively connected to said elevating member, and valve controlled means for supplying fluid under pressure to said supply member, said fluid supply serving to initially raise said elevating member endwise of and relative to said extensible guides throughout their length and thereafter simultaneously raise said extensible guides and elevating member.

3. In a truck, having in combination, a pair of main guides on the truck frame, a pair of extensible guides telescopically mounted on said main guides for movement endwise relative thereto, an elevating member slidably mounted on said extensible guides for movement relative to and endwise thereof, a tubular guide member mounted on the truck frame, a fluid pressure system, including a source of supply, a plurality of concentrically related fluid pressure operated, relatively movable members having connected fluid passages between them, the inner concentric member being slidably mounted on said tubular member, said inner and outer members being connected together at their lower ends and said intermediate member being movable relative to said inner and outer members and extending beyond the upper end of said outer member and operatively connected to said elevating member, a fluid connection between said tubular member and the adjacent fluid passage and a fluid connection between said source of supply and said tubular member, said relatively movable members serving to initially raise said elevating member endwise of and relative to said extensible guides to a predetermined height or level and thereafter simultaneously raise said extensible guides and elevating member to position the latter at a level above the predetermined height or level.

4. In a truck, having in combination, a pair of main guides on the truck frame, a pair of extensible guides telescopically mounted on said main guides for endwise movement, an elevating member slidably mounted on said extensible guides for movement endwise thereof, and a fluid pressure system, including a source of supply, a plurality of concentrically related fluid pressure operated, relatively movable members, forming fluid passages between them, consisting of an innermost device having a fluid passage therein and stationarily mounted on the truck frame and inner, outer and intermediate cylinders slidable on said stationary device, the upper end of said inner cylinder being connected to said extensible guides and its lower end being connected to the lower end of said outer cylinder and said intermediate cylinder being movable relative to said inner and outer cylinders and extending upwardly beyond the upper end of the latter cylinder, operating connections between the upper end of said intermediate cylinder and said elevating member, a fluid connection leading from said source of fluid pressure supply to the lower end of the fluid passage in said device, a fluid connection between the last mentioned fluid passage and the fluid passage in said inner cylinder, a fluid connection between the passage in said inner cylinder and the fluid passage in said intermediate cylinder, and a valve for controlling the supply of fluid to the fluid passage in said device, said fluid supply serving to initially move said intermediate cylinder relative to said inner and outer cylinders a predetermined distance to raise said elevating member along and relative to said extensible guides and thereafter move said inner, intermediate and outer cylinders relative to said device to move said extensible guides upwardly and said elevating member therewith.

5. A truck as claimed in claim 4 wherein stops are provided on said outer and intermediate cylinders to limit the upward movement of the latter and separate stops are provided on said device and inner cylinder to limit the upward movement of said inner cylinder.

6. A truck as claimed in claim 3 wherein said operating connections between said intermediate member and said elevating member consist of a reeving element rotatably mounted on the upper end of said intermediate member and a flexible member engaging with said reeving element and anchored at its inner end on said outer member and connected at its outer end to said elevating member.

7. In a main truck, having in combination, a guide, disposed substantially vertically, mounted on the frame of the truck, an extensible guide extending upwardly to a predetermined height or level and slidably mounted on said main guide, an elevating device slidably mounted on said extensible guide for movement upwardly and downwardly, and a fluid pressure system, including a tubular member mounted on the truck frame in parallel relation to said guides, valve controlled means for supplying fluid under pressure connected to said tubular member, relatively movable cylindrical members disposed in concentric relation, said inner member being slidably mounted on said tubular member, the side walls of said tubular member and said inner cylindrical member being formed with openings to provide for flow of the fluid from said tubular member to said inner cylindrical member and from said inner cylindrical member to said intermediate member, said intermediate cylindrical member being operatively connected to said elevating device and said inner cylindrical member being connected to said extensible guide, said fluid supply serving to initially raise said intermediate cylindrical member relative to said inner cylindrical member a predetermined distance to move said elevating device upwardly relative to said extensible guide to the predetermined height or level and thereafter raise the other cylindrical members and extensible guide upwardly.

8. In a truck, having in combination, a pair of main guides, a pair of extensible guides mounted on said main guides for endwise movement, an elevating member slidably mounted on said extensible guides for movement endwise thereof, a fluid pressure system comprising a vertically disposed member mounted at its lower end on the truck and formed with a flow passage extending longitudinally thereof and open at its upper end, concentrically related inner, outer and intermediate cylinders, annular elements between said cylinders and between said inner cylinder and said member for providing flow passages within said cylinders and said inner cylinder having an end wall at its upper end operatively connected with said extensible guides and connected at its lower end with said outer cylinder, fluid connections between the flow passage in said member and the flow passage in said inner cylinder and between the latter passage and the flow passage in said intermediate cylinder, operating connections between the upper end of said intermediate cylinder and said elevating member arranged to raise the latter and a source of supply of fluid under pressure connected to the flow passage in said member, the annular element at the upper end of said intermediate cylinder and between it and said inner cylinder having an area greater than the area of the end wall for said inner cylinder, whereby the supplied pressure will be effective to initially move said intermediate cylinder upwardly relative to said inner and outer cylinders and said elevating member along and on said extensible guides to a predetermined level, the inter-engageable stops on the opposed walls of said outer and intermediate cylinders arranged to limit the upward movement of the latter, whereby the supplied pressure will be effective on the end wall of said inner cylinder to raise said cylinders and said extensible guides to a higher level.

MAX LEHMANN.

REFERENCES CITED

The following references are of record in the file of this patent:

UNITED STATES PATENTS

| Number | Name | Date |
| --- | --- | --- |
| 2,480,066 | Weaver | Aug. 23, 1949 |
| 2,505,009 | Schroeder | Apr. 25, 1950 |
| 2,518,251 | Quayle | Aug. 8, 1950 |